United States Patent [19]

Shatney

[11] 3,890,447

[45] June 17, 1975

[54] PERMEABLE MEAT CASINGS

[75] Inventor: Robert H. Shatney, Midland, Mich.

[73] Assignee: The Dow Chemical Company, Midland, Mich.

[22] Filed: June 2, 1972

[21] Appl. No.: 259,292

[52] U.S. Cl. ............... 426/105; 426/135; 426/413; 426/315
[51] Int. Cl. .............................................. A22c 13/00
[58] Field of Search ............... 99/176, 229, 171 LP; 426/105, 135, 138, 140, 413, 315

[56] References Cited
UNITED STATES PATENTS

| 1,890,215 | 12/1932 | DeCressey | 99/176 |
|---|---|---|---|
| 2,420,310 | 5/1947 | Goodman | 99/176 |
| 2,608,488 | 8/1952 | Rumsey | 99/176 |
| 2,704,259 | 3/1955 | Lamb | 99/176 |
| 2,956,671 | 10/1960 | Cornwell | 99/171 LP |
| 3,037,868 | 6/1962 | Rosser | 99/176 |
| 3,510,318 | 5/1970 | Kernbach | 99/229 |

FOREIGN PATENTS OR APPLICATIONS

| 1,963,798 | 6/1971 | Germany | 99/176 |
|---|---|---|---|

Primary Examiner—Norman Yudkoff
Assistant Examiner—Hiram H. Bernstein
Attorney, Agent, or Firm—Arthur J. Young

[57] ABSTRACT

A multilayer thermoplastic resinous film or tubing useful as a casing for smoked meats, sausages and the like having a body supporting layer punctured with a plurality of small holes and at least one other layer of thermoplastic resinous material which is highly permeable to smoke and resistant to the penetration of greases.

17 Claims, No Drawings

PERMEABLE MEAT CASINGS

BACKGROUND OF THE INVENTION

1. Field of the Invention

This invention relates to packaging materials for food products, with particular reference to a film or tubing useful as a casing for smoked meats, sausages and the like.

2. Description of the Prior Art

At the present time most smoke processed meats, sausages and the like are smoked in permeable cellulose casings. The cellulose casings allow smoke to penetrate through the casings and into the meat therein, but do not allow grease to come out of the casings.

However, as compared to most thermoplastic resinous materials, the cellulose material used to form smoked meat casings is relatively expensive. Also, the filling of the cellulose casing with a food product is generally done by hand.

SUMMARY

In general, the present invention provides a multilayered film or tubing construction useful as a casing for smoked meats, sausages and the like. The multilayered construction comprises a body supporting layer having a plurality of holes therein to allow passage of smoke, said layer formed from a thermoplastic resinous material such as saran, Mylar or polyvinyl chloride which provides sufficient strength and stability at smoke processing temperatures to keep the food products being processed in the proper shape, and at least one other layer secured to the body supporting layer of a thermoplastic resinous material such as a polyolefin, polystyrene or cellulose which is highly permeable to allow the passage of smoke into the food product during processing, but which prevents greases in the food product from coming through the holes in the body supporting layer.

The layers of the multilayered film or tubing can be formed by conventional means such as calendering, casting or extrusion, and the body supporting layer can be punctured to form the plurality of holes therethrough by conventional means such as needle perforation or electric arc discharge. Thereafter the layers can be combined by known lamination means and if formed as a film can be heat or otherwise sealed to form a tube if desired.

In deriving the present invention, it was found that a casing of a material such as saran with a plurality of holes to allow the passage of smoke during processing did provide a stable shape for the food product being processed, but did not prevent greasing out from occurring. Difficulty in removing the casing after processing resulted because some of the food product was forced out through the holes when greasing out occurred during processing. It was also found that a casing of a thermoplastic material such as a polyolefin would permit sufficient smoke penetration into the food product during processing to obtain a satisfactory smoke cured product, but did not have sufficient strength at smoke processing temperature to maintain the proper sausage shape. By combining a hole punctured layer such as saran with good strength properties and a layer such as a polyolefin with high permeability to smoke, it was discovered that a permeable casing for smoked meat, sausage and the like can be produced that overcomes the difficulties of separately using the individual materials and combines the good features of both.

The body supporting layer can be from about 1 to 15 mils thick and is preferably from about 2 to 6 mils thick. The permeable layer can be from about 0.2 to 5 mils thick and is preferably from about 0.5 to 1 mils thick. The size and number of holes in the body support layer can be varied depending on the degree of smoke cure required, but a relatively large number of small holes are preferred to obtain maximum smoke penetration into the meat.

The permeable layer may be placed in the casing such that it does or does not contact the food product, however, it is preferably placed in contact with the food product since it is generally formed from a material which imparts little or no taste or odor to foods. Additional permeable or body supporting layers may be employed with the present invention, but are not preferred because maximum smoke penetration is generally desired. Due to the continuous nature of forming the casings of the present invention; it is possible to utilize automatic filling equipment during packaging of the food product.

Polyolefin is herein defined as polyethylene, polypropylene, resinous copolymers of ethylene and propylene and polymers of ethylene and/or propylene with minor proportions of olefinically unsaturated monomers such as, for example, those alpha-olefins having from two to eight carbon atoms such as 1-butene, 1-pentene, 1-hexene, 1-heptene, 1-octene and mixed higher alpha-olefins. Other hydrocarbons useful for making copolymers with ethylene and propylene include divinylbenzene, allene, dimethallyl and isopentene. Comonomers which can broadly be used include mono-substituted ethylenes such as 1-pentene, vinylcyclohexene, allyl 8-$C_8$-$C_{14}$ mixed alpha-olefins, styrene, allyl naphthalene, and the like, 1,1-disubstituted ethylenes such as alpha-methyl styrene, 2-methylbutene-1, mixed alpha- and beta-pinenes, camphene and the like, 1,2-disubstituted ethylenes such as indene, acenaphthalene, cyclopentene, norbornylene, cyclohexene, trans-stilbene, 2-pentene and the like, conjugated dienes and trienes such as pentadiene-1,3,1,2-dihydrobenzene, bicycloheptadiene, bicyclopentadiene, 4-vinylcyclohexene-1, and 4,7-diphenyl decadiene-1,9, acethylenes such as isopropenyl acetylene and phenyl acetylene, chloroolefins such as beta-methallyl chloride and chloromethyl norbornylene, and m-chlorostyrenes, ethers and epoxides, esters such as vinyl butyrate, vinyl acetate, and methyl acrylate, and nitrogen compounds such as vinyl carbozole, 4-vinyl pyridene and acrylonitrile and mixtures and blends thereof.

A wide variety of thermoplastic resinous materials forming the body supporting layer may be employed in accordance with the present invention. Particularly suited body supporting layers are combinations of vinylidene chloride polymers, vinyl chloride polymers, vinylidene fluoride polymers and extrudable mixtures thereof. Particularly advantageous and beneficial are extrudable compositions of vinylidene chloride polymers, wherein the polymers contain at least about 70 weight percent vinylidene chloride, the remainder being one or more olefinically unsaturated monomers copolymerizable therewith. Suitable vinylidene chloride polymers are prepared utilizing such comonomers as methyl, ethyl, isobutyl, butyl, octyl and 2-ethyl-hexyl acrylates and methacrylate; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid, methyl alpha-chloro-acrylate, octyl alpha-chloro-acrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbozole, isopropenyl acetate, acrylamide, methacrylamide or monoalkyl substitution products thereof, phenyl vinyl ketone, diethyl fumarate, diethyl maleate, methylene diethyl malenate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl salol. Other compositions which may be used with benefit in films in accordance with the present invention are vinyl chloride polymers which contain a predominant amount of vinyl chloride therein, and beneficially, fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluroethylene and vinyl chloride, chlorotrifluoroethylene-vinylidene fluoride and tetrafluoroethylene and the like might also be used. Generally, for economic reasons, the vinylidene chloride polymers are employed as they are most readily available at relatively low cost.

Beneficially, in the forming of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for forming the same is substantially reduced and the probability of decomposition of the polymer is lowered. Typical plasticizers which are employed in the vinylidene or saran combinations are acetyl tributyl citrate, epoxidized soybean oil (commercially available under the trade designation of Paraplex G-60), dibutyl sebacate, and polymeric plasticizers such as, for example, certain copolymers of ethylene and vinyl acetate.

Although an adhesive is not necessarily required to laminate the body supporting and permeable layers together since very little adhesion is required for the intended enduse, adhesives which may be employed are copolymers of ethylene and vinyl acetate, advantageously in proportions of from about 14 weight percent to about 40 weight percent vinyl acetate with from about 86 weight percent to about 60 weight percent ethylene, copolymers of ethylene and ethylacrylate advantageously in proportions of from about 20 to 30 weight percent ethylacrylate with from about 80 to 70 weight percent ethylene, copolymers of ethylene with isobutyl acrylate, advantageously in proportions of from about 20 to 30 weight percent isobutyl acrylate with from about 80 to 70 weight percent of ethylene and chlorinated polyethylene, advantageously containing from about 15 to 40 weight percent chlorine. A particularly preferred adhesive is a block copolymer of styrene and butadiene. Blends of such adhesive materials may also be employed.

DESCRIPTION OF THE PREFERRED EMBODIMENTS

The following example illustrates the manner in which the principles of the invention are applied but is not construed as limiting the scope of the invention:

A three layer film useful in making casings for smoke processed meats, sausages and the like can be prepared by laminating or otherwise combining or forming a perforated body supporting layer having 800 holes per square inch formed by a needle punch of 5 mils diameter and the layer comprising 96 parts by weight of a copolymer of 85 weight percent vinylidene chloride and 15 weight percent vinyl chloride, 3 parts by weight of a copolymer of 67 weight percent ethylene and 33 weight percent vinyl acetate having a melt index of 22–28 and a density at 23°C. of 0.957 and 1 part by weight of tetrasodium pyrophosphate to a permeable layer of polyethylene having a melt index of 3.8 and a density of 0.93 with an adhesive comprising an ethylene-vinyl acetate copolymer containing 28 weight percent vinyl acetate (sold under the trade designation Elvax 260) and having a melt index of 6 and a density of 0.954. The polyethylene and adhesive layers may be coextruded or otherwise formed. The body supporting layer can be mils thick, the permeable layer 0.5 mils thick and the adhesive layer 0.2 mils thick. The film is heat sealed to form a sausage tube casing which is then filled with processed meat and smoke cured.

Thus, while certain representative embodiments and details have been described for the purpose of illustrating the invention, it will be apparent to those skilled in the art that various changes and modificatiions can be made therein without departing from the spirit and scope of the invention.

What is claimed is:

1. A multilayered thermoplastic resinous film useful as a casing for smoking meat or sausage products and the like comprising a body supporting layer having a plurality of holes therethrough to allow passage of smoke into said meat or sausage products and at least one other layer which is highly permeable to the penetration of smoke and resistant to the penetration of greases.

2. The multilayered thermoplastic resinous film of claim 1 wherein said film is heat sealed into a tube to form said casing.

3. The multilayered thermoplastic resinous film of claim 1 wherein said body supporting layer is a copolymer of vinylidene chloride and one or more olefinically unsaturated monomers copolymerized therewith.

4. The multilayered thermoplastic resinous film of claim 3 wherein said other layer is polyolefin.

5. The multilayered thermoplastic resinous film of claim 4 wherein said polyolefin is polyethylene.

6. A food package comprising an outer casing substantially filled with meat or sausage products and the like to be smoked, said casing having walls comprising a body supporting layer providing strength and stability at smoke processing temperatures and having a plurality of holes therethrough to allow the passage of smoke into said meat or sausage products and at least one other layer which is highly permeable to the penetration of smoke and resistant to the penetration of greases.

7. The food package of claim 6 wherein said body supporting layer is a copolymer of vinylidene chloride and one or more olefinically unsaturated monomers copolymerized therewith.

8. The food package of claim 7 wherein said other layer is polyolefin.

9. The food package of claim 8 wherein said polyolefin is polyethylene.

10. A food package comprising an outer casing substantially filled with smoked meat or sausage products and the like, said casing having walls comprising a body supporting layer providing strength and stability at smoke processing temperatures and having a plurality of holes therethrough to allow the passage of smoke into said meat or sausage products and at least one other layer which is highly permeable to the penetration of smoke and resistant to the penetration of greases.

11. The food package of claim 10 wherein said body supporting layer is a copolymer of vinylidene chloride and one or more olefinically unsaturated monomers copolymerized therewith.

12. The food package of claim 11 wherein said other layer is polyolefin.

13. The food package of claim 12 wherein said polyolefin is polyethylene.

14. A method of packaging smoked meat or sausage products and the like comprising:
    providing an outer casing for said meat or sausage products and the like, said casing having walls comprising a body supporting layer with strength and stability to maintain a uniform shape of said meat or sausage product at smoke processing temperatures and having a plurality of holes therethrough to allow the passage of smoke into said meat or sausage product and at least one other layer which is permeable to the penetration of smoke and resistant to the penetration of grease;
    substantially filling said outer casing with said meat or sausage product; and
    smoking said filled casing until said meat or sausage product is cured.

15. The method of claim 14 wherein said body supporting layer is a copolymer of vinylidene chloride and one or more olefinically unsaturated monomers copolymerized therewith.

16. The method of claim 15 wherein said other layer is polyolefin.

17. The method of claim 16 wherein said polyolefin is polyethylene.

* * * * *